United States Patent
Saito et al.

(10) Patent No.: US 12,504,306 B2
(45) Date of Patent: Dec. 23, 2025

(54) ABSOLUTE ENCODER

(71) Applicant: MINEBEA MITSUMI Inc., Nagano (JP)

(72) Inventors: Katsunori Saito, Nagano (JP); Takeshi Sakieda, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 295 days.

(21) Appl. No.: 18/551,934

(22) PCT Filed: Mar. 11, 2022

(86) PCT No.: PCT/JP2022/010842
§ 371 (c)(1),
(2) Date: Sep. 22, 2023

(87) PCT Pub. No.: WO2022/209746
PCT Pub. Date: Oct. 6, 2022

(65) Prior Publication Data
US 2024/0175724 A1  May 30, 2024

(30) Foreign Application Priority Data
Mar. 31, 2021 (JP) .................. 2021-062046

(51) Int. Cl.
*G01D 5/249* (2006.01)
*G01D 5/04* (2006.01)
(Continued)

(52) U.S. Cl.
CPC ............. *G01D 5/2497* (2013.01); *G01D 5/04* (2013.01); *G01D 5/145* (2013.01);
(Continued)

(58) Field of Classification Search
CPC .......... G01D 5/14; G01D 5/145; G01D 5/244; G01D 5/24433; G01D 5/2497;
(Continued)

(56) References Cited

U.S. PATENT DOCUMENTS

2009/0263061 A1* 10/2009 Takahashi ............... G01P 3/487
384/446
2010/0052663 A1  3/2010 Mehnert et al.
(Continued)

FOREIGN PATENT DOCUMENTS

EP   2 159 547 A2   3/2010
JP   2013-024572 A   2/2013
WO   2020/203467 A1  10/2020

OTHER PUBLICATIONS

International Search Report for corresponding International Application No. PCT/JP2022/010842 mailed Apr. 26, 2022.
(Continued)

*Primary Examiner* — Steven L Yeninas
(74) *Attorney, Agent, or Firm* — Chrisman Gallo Tochtrop LLC

(57) ABSTRACT

To suppress deterioration in the detection accuracy of a rotation angle of a magnet even when a member located in the vicinity of the magnet is made of a magnetic material. An absolute encoder includes a first sub-shaft gear configured to rotate based on rotation of a main shaft, a bearing part configured to rotatably support the first sub-shaft gear around an axial line A, a support shaft configured to support the bearing part, and a spacer provided between the first sub-shaft gear and the bearing part. At least a part of the spacer is formed of a magnetic material, and the spacer is formed extending in a direction intersecting the axial line A.

7 Claims, 13 Drawing Sheets

(51) Int. Cl.
   *G01D 5/14*     (2006.01)
   *G01D 5/244*    (2006.01)
(52) U.S. Cl.
   CPC ..... *G01D 5/24433* (2013.01); *G01D 2205/26* (2021.05); *G01D 2205/28* (2021.05); *G01D 2205/40* (2021.05)
(58) Field of Classification Search
   CPC .......... G01D 5/34738; G01D 2205/26; G01D 2205/28; G01D 2205/40; G01D 3/08
   See application file for complete search history.

(56) References Cited

U.S. PATENT DOCUMENTS

| | | |
|---|---|---|
| 2011/0080162 A1 | 4/2011 | Steinich et al. |
| 2011/0137609 A1* | 6/2011 | Itomi .................... G01D 5/145 |
| | | 324/207.25 |
| 2013/0015333 A1 | 1/2013 | Miyajima et al. |
| 2014/0077922 A1* | 3/2014 | Horiguchi ............ H01C 10/103 |
| | | 338/12 |
| 2019/0277668 A1* | 9/2019 | Osada ...................... H02P 6/16 |
| 2020/0132507 A1* | 4/2020 | Osada ..................... G01D 5/14 |
| 2022/0196380 A1 | 6/2022 | Saito et al. |

OTHER PUBLICATIONS

Written Opinion for corresponding International Application No. PCT/JP2022/010842 dated Apr. 26, 2022.

\* cited by examiner

ABSOLUTE ENCODER

CROSS-REFERENCE TO RELATED APPLICATIONS

This application is a national stage entry of International Application No. PCT/JP2022/010842 filed on Mar. 11, 2022, which claims the benefit of priority to Japanese Application No. JP2021-062046, filed Mar. 31, 2021, the entire disclosures of which are hereby incorporated herein by reference.

TECHNICAL FIELD

The present invention relates to an absolute encoder, and particularly to a structure of a sub-shaft part.

BACKGROUND ART

Conventionally, in various types of control mechanical apparatuses, as a rotary encoder used for detecting the position and the angle of a movable element, an absolute encoder of an absolute type detecting an absolute position or angle (hereinafter referred to as "absolute encoder") has been known.

Some absolute encoders measure the amount of rotation of a main shaft based on the rotation angle of a sub-shaft. Such an absolute encoder detects a rotation angle of a magnet on the basis of a change in a magnetic field of the magnet attached to a distal end of a rotating body such as a sub-shaft supported by a bearing or a gear attached to the sub-shaft, and detects a rotation angle of the sub-shaft. The rotation angle of the magnet is detected by an angle sensor provided opposite to the magnet (for example, see Patent Document 1).

CITATION LIST

Patent Literature

Patent Document 1: JP 2013-24572 A

SUMMARY OF INVENTION

Technical Problem

In such an absolute encoder detecting the rotation angle of the magnet, a magnetic flux of the magnet detected by the angle sensor periodically changes as the rotation axis rotates, and the rotation angle of the magnet is detected based on the change in the magnetic flux in a predetermined rotation period of the rotation axis. Therefore, when a difference occurs in the change of the magnetic flux detected by the angle sensor in a predetermined rotation period, the rotation angle of the magnet cannot be accurately detected, and the rotation angle of the rotation axis cannot be accurately detected. For example, when a member disposed in the vicinity of the rotation axis is formed of a magnetic material, the member forms a magnetic path of the magnetic flux from the magnet, and the distribution of the magnetic flux from the magnet detected by the angle sensor may be disturbed. Due to the disturbance of the magnetic flux distribution, a difference occurs in the change of the magnetic flux detected by the angle sensor in a predetermined rotation period, and the rotation angle of the magnet cannot be accurately detected. This may affect the detection accuracy of the amount of rotation of the main shaft.

As described above, some absolute encoders have a shaft supported by a bearing, and in such absolute encoders, the bearing is provided close to a magnet. Some of such bearings are made of a magnetic material from the viewpoint of strength, durability, and the like. As described above, the bearing made of a magnetic material forms a magnetic path, and may cause a disturbance in the distribution of the magnetic flux from the magnet detected by the angle sensor. Due to the disturbance of the magnetic flux, a difference occurs in the change of the magnetic flux detected by the angle sensor in a predetermined rotation period, and the rotation angle of the magnet cannot be accurately detected. Therefore, in this type of absolute encoder, in order to improve detection accuracy, there is a demand for a structure capable of suppressing deterioration in the detection accuracy of the rotation angle of the magnet even when a member located in the vicinity of the magnet, such as a bearing supporting the shaft, is made of a magnetic material.

The present invention has been made in view of the above-described problem, and an object of the present invention is to provide an absolute encoder capable of suppressing deterioration in the detection accuracy of a rotation angle of a magnet even when a member located in the vicinity of the magnet is made of a magnetic material.

Solution to Problem

In order to achieve the above object, an absolute encoder according to the present invention includes: a sub-shaft gear configured to rotate based on rotation of a main shaft; a bearing part configured to rotatably support the sub-shaft gear around an axial line; a shaft part configured to support the bearing part; and a spacer provided between the sub-shaft gear and the bearing part, wherein at least a part of the spacer is formed of a magnetic material, and the spacer is formed extending in a direction intersecting the axial line.

Advantageous Effects of Invention

According to the absolute encoder of the present invention, it is possible to suppress deterioration in the detection accuracy of a rotation angle of a magnet even when a member located in the vicinity of the magnet is made of a magnetic material.

DESCRIPTION OF EMBODIMENTS

Figure 1:
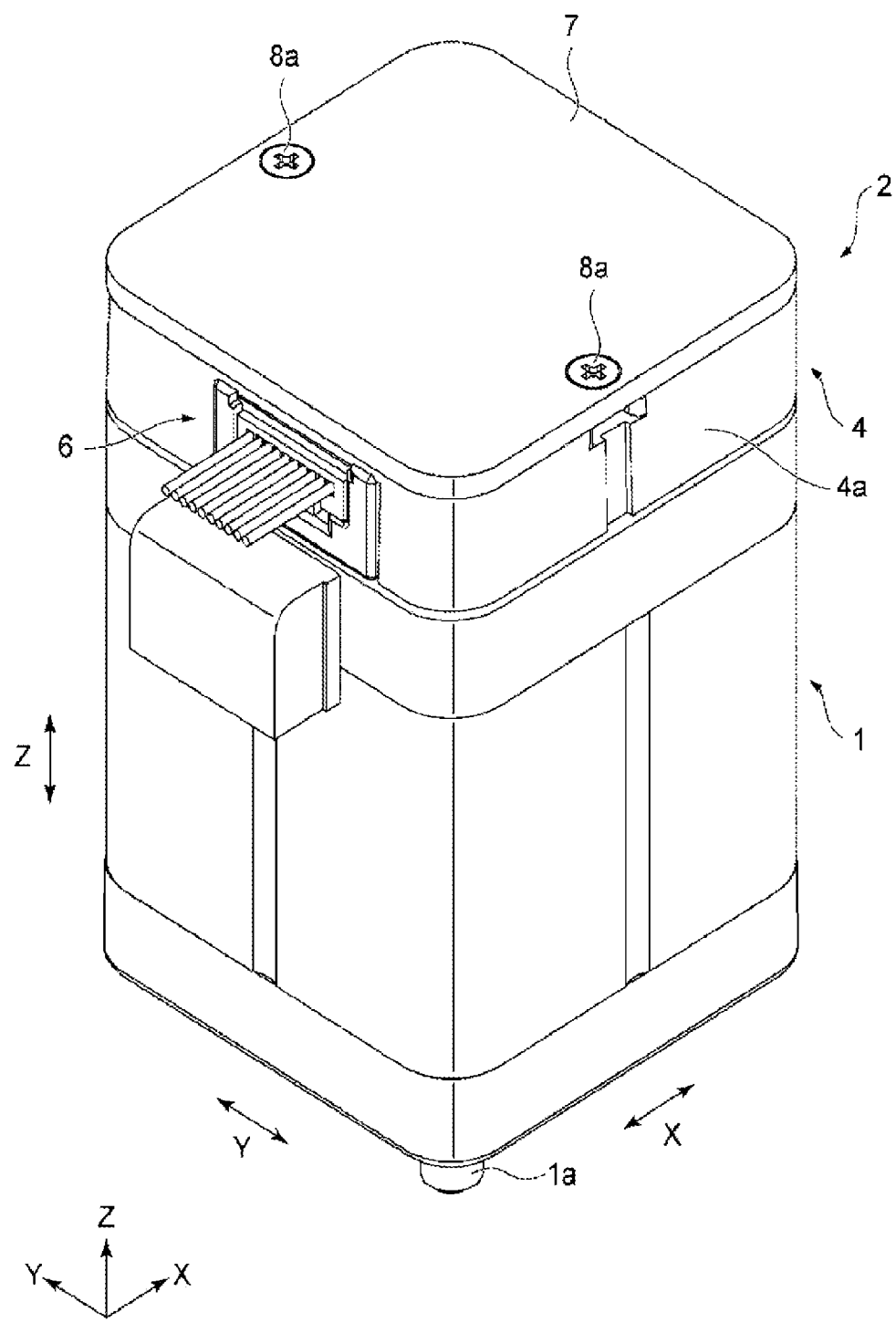
FIG. 1 is a perspective view schematically illustrating a configuration of an absolute encoder according to an embodiment of the present invention.

The present inventors have found that in an absolute encoder, the amount of rotation over multiple rotations (hereinafter, also referred to as a plurality of rotations) of the main shaft (hereinafter, also referred to as the amount of rotation of the main shaft) can be specified by acquiring the rotation angle of a rotating body configured to decelerate and rotate with the rotation of the main shaft. That is, the amount of rotation of the main shaft can be specified by multiplying the rotation angle of the rotating body by a reduction ratio. Here, the range of the specifiable amount of rotation of the main shaft increases in proportion to the reduction ratio. For example, if the reduction ratio is 50, the amount of rotation of the main shaft over 50 rotations can be specified.

On the other hand, the required resolution of the rotating body decreases in proportion to the reduction ratio. For example, if the reduction ratio is 100, the resolution required for the rotating body per rotation of the main shaft is 360°/100=3.6°, and a detection accuracy of ±1.80 is required. On the other hand, when the reduction ratio is 50, the resolution required for the rotating body per rotation of the main shaft is 360°/50=7.2°, and a detection accuracy of ±3.6° is required.

Embodiments of the present invention will be described below with reference to the drawings. In the embodiments and modifications to be described below, the same or equivalent components and members are denoted by the same reference numerals, and duplicate description will be omitted as appropriate. The dimensions of the members in each drawing are enlarged or reduced as appropriate to facilitate understanding. Furthermore, some members not critical in describing embodiments are omitted from the drawings. Also, in the drawings, gears are illustrated without a gear shape. Terms including ordinal numbers such as "first" and "second" are used to describe various components, but these terms are used only for the purpose of distinguishing one component from other components and the components are not limited by these terms. Note that the present invention is not limited by the embodiments described below.

Figure 2:
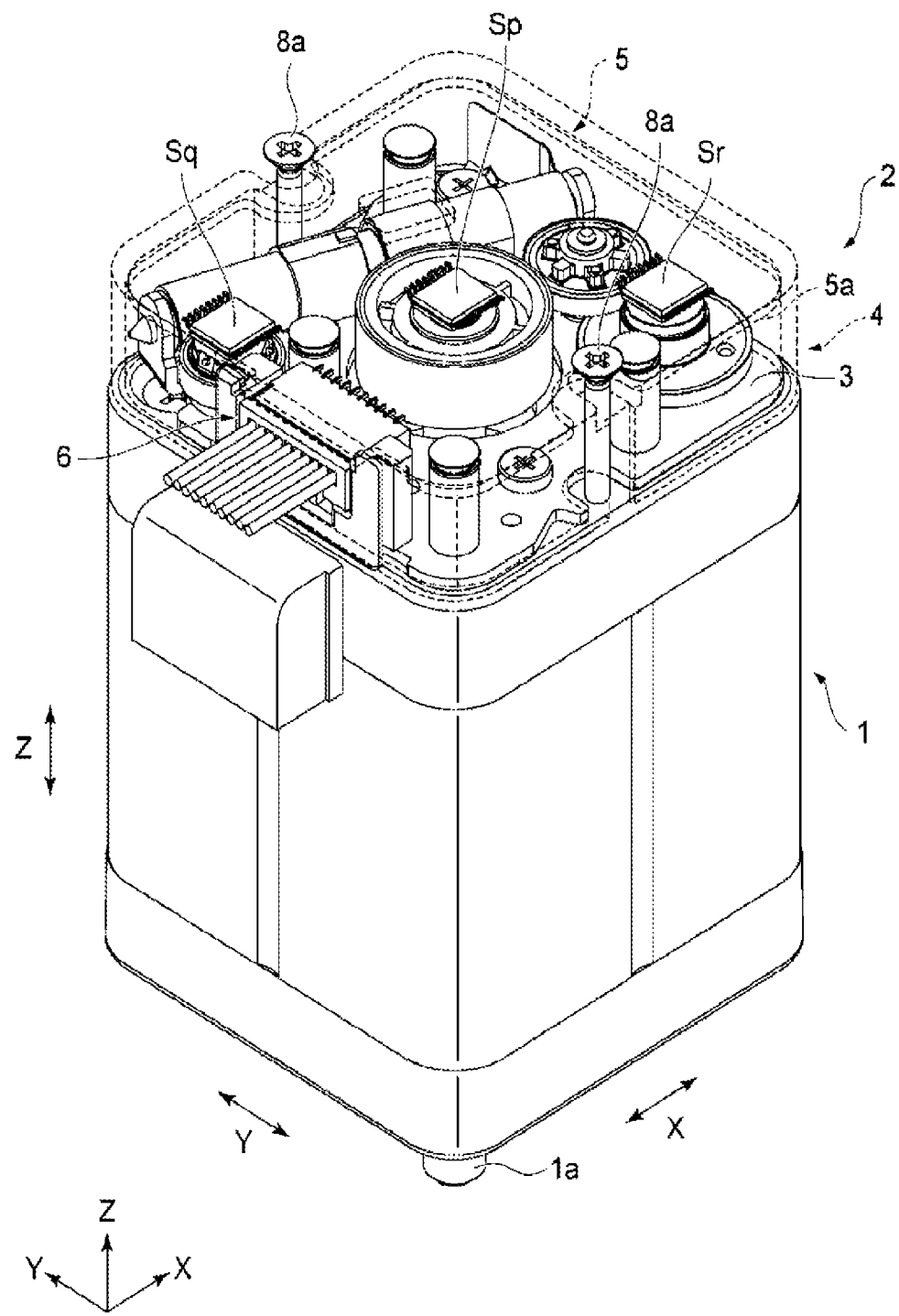
FIG. 2 is a perspective view schematically illustrating the configuration of the absolute encoder illustrated in FIG. 1 with a shield plate removed.
Figure 3:
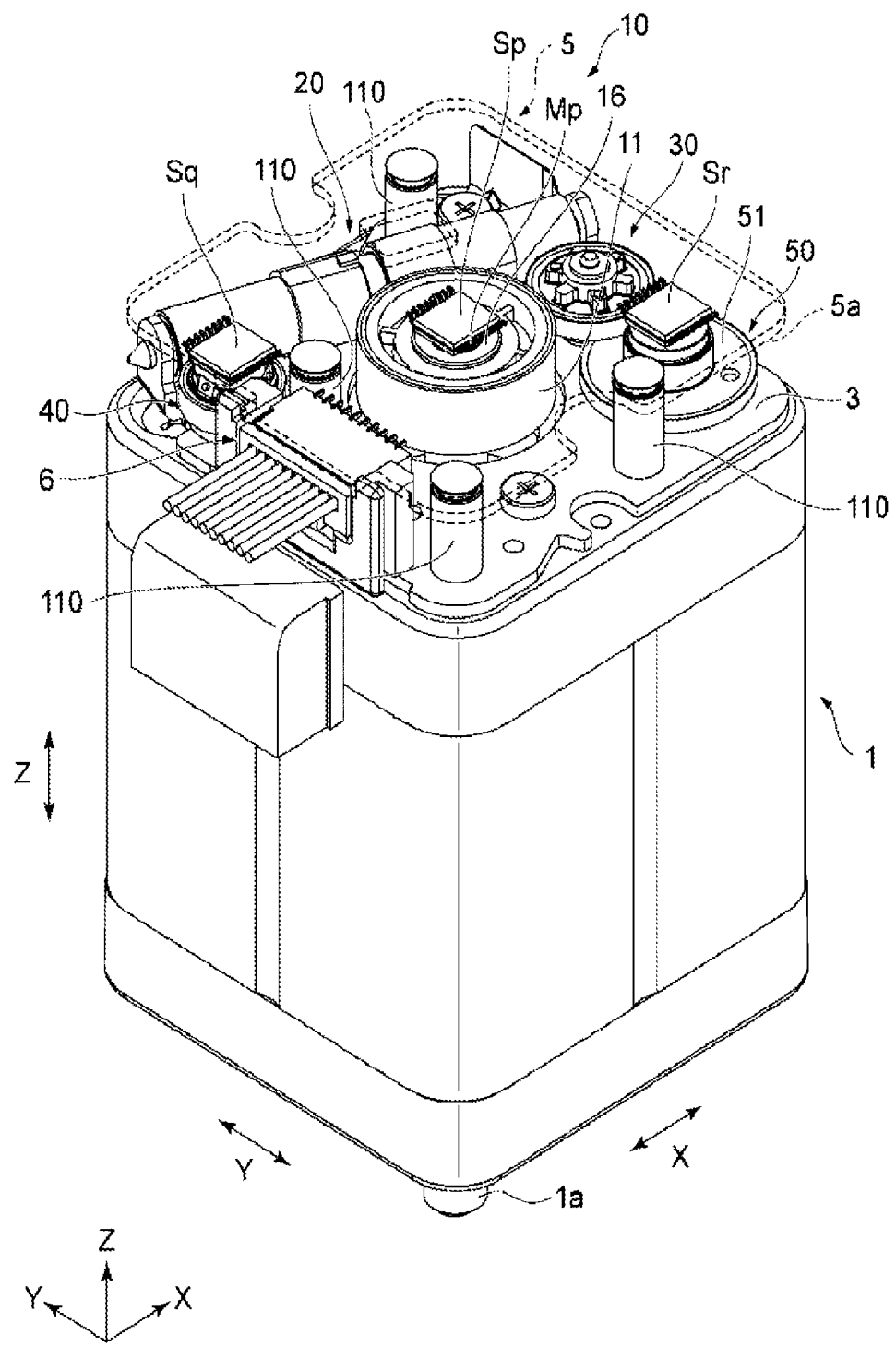
FIG. 3 is a perspective view schematically illustrating the configuration of the absolute encoder illustrated in FIG. 2 with a case removed.
Figure 4:
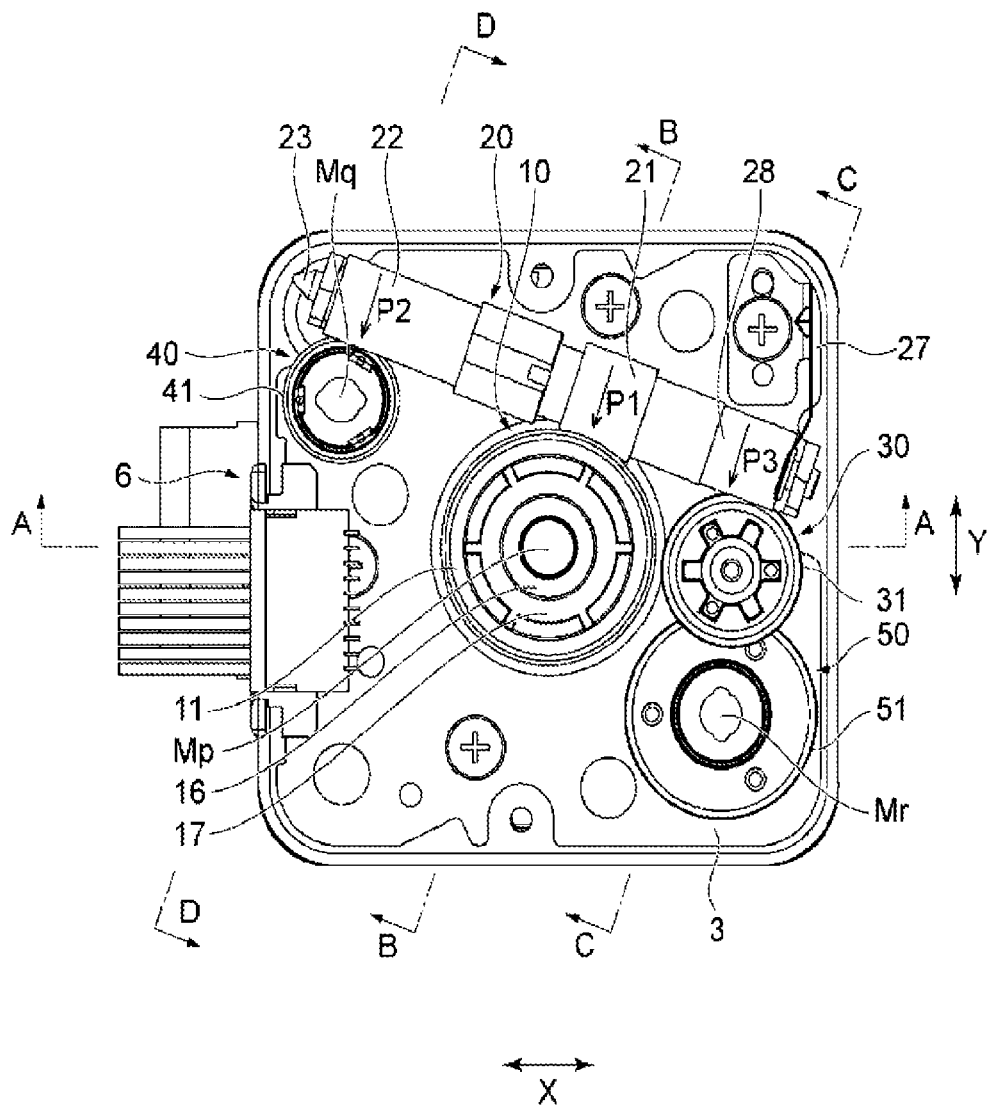
FIG. 4 is a plan view schematically illustrating the configuration of the absolute encoder illustrated in FIG. 3 with a substrate removed.
Figure 5:
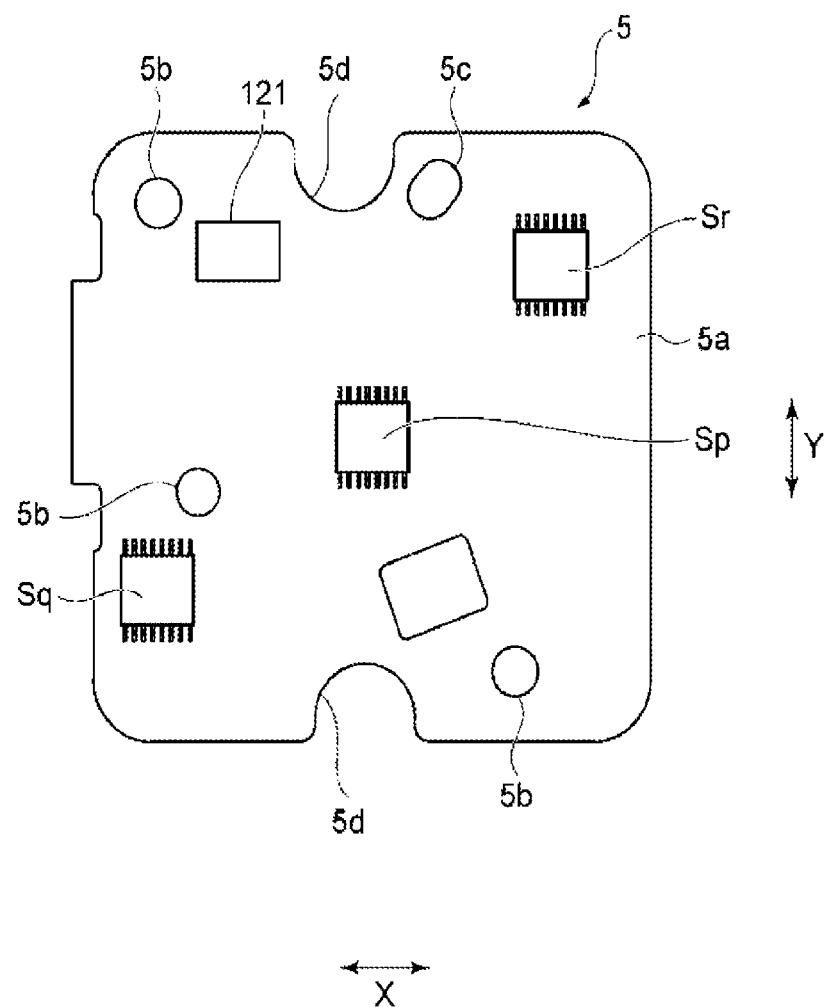
FIG. 5 is a view illustrating an angle sensor support substrate illustrated in FIG. 3 when viewed from a lower surface side.
Figure 6:
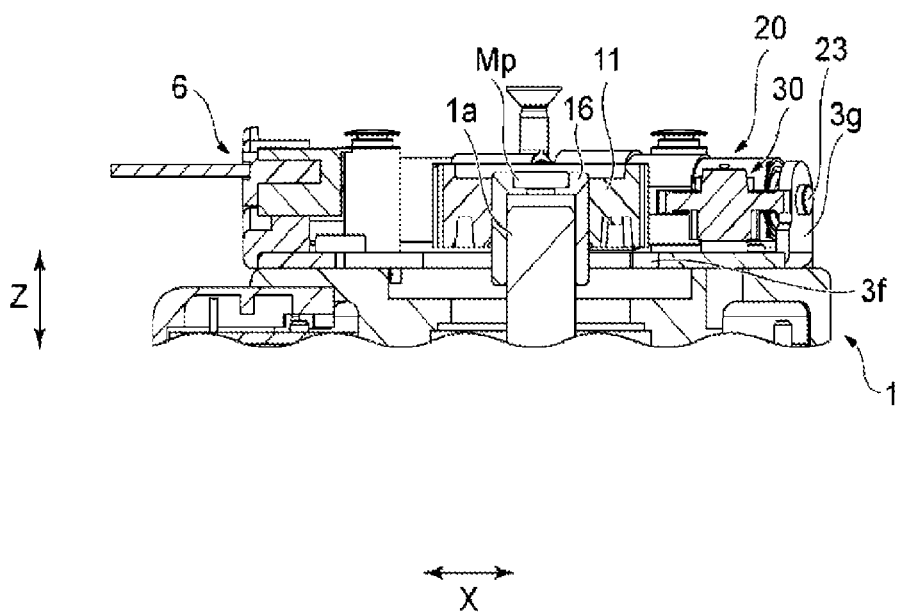
FIG. 6 is a cross-sectional view of the absolute encoder illustrated in FIG. 4 taken along line A-A.
Figure 7:
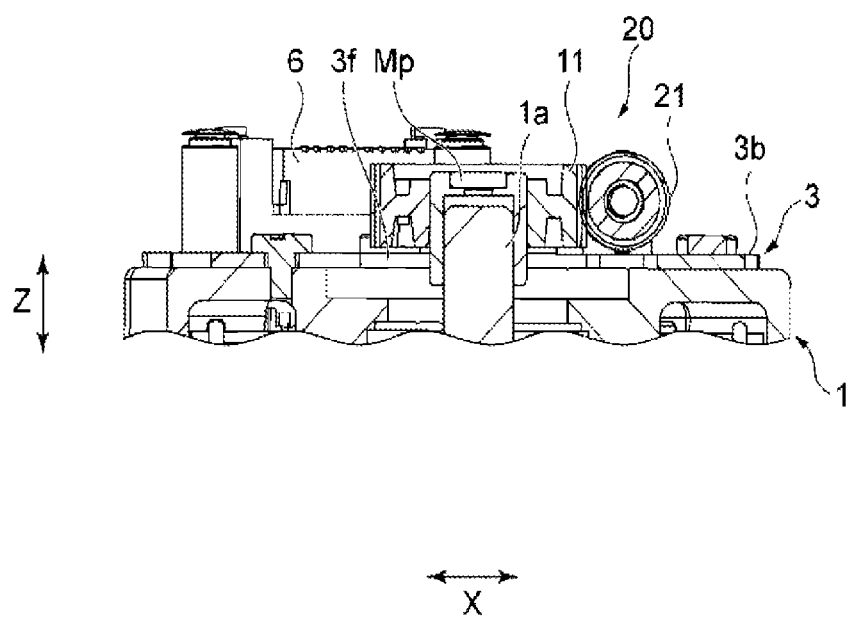
FIG. 7 is a cross-sectional view of the absolute encoder illustrated in FIG. 4 taken along line B-B.
Figure 8:
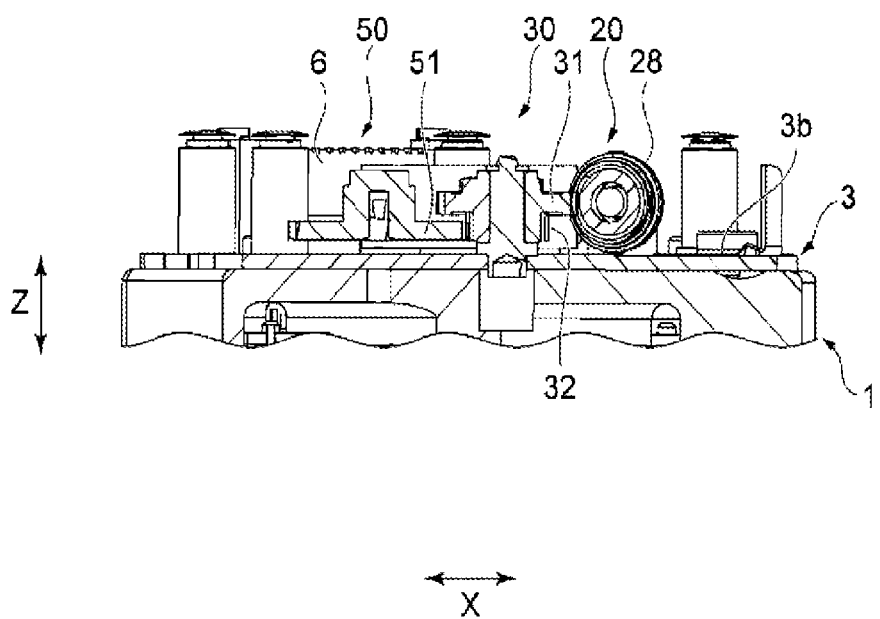
FIG. 8 is a cross-sectional view of the absolute encoder illustrated in FIG. 4 taken along line C-C.
Figure 9:
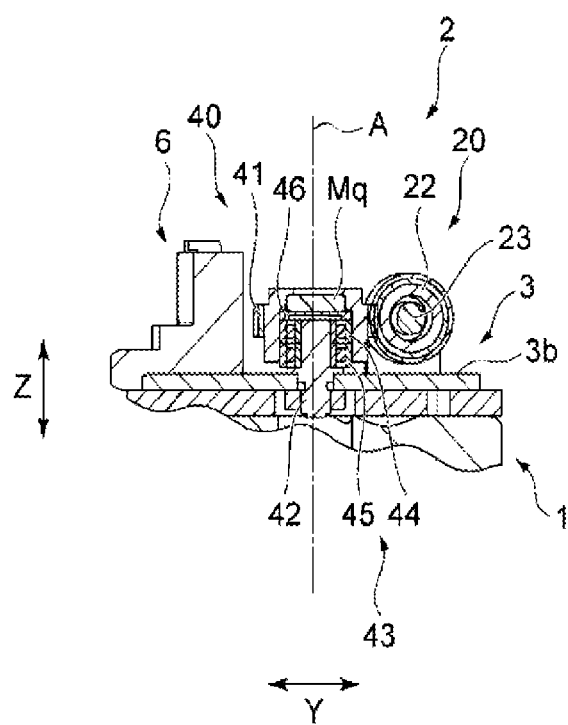
FIG. 9 is a cross-sectional view of the absolute encoder illustrated in FIG. 4 taken along line D-D.
Figure 10:
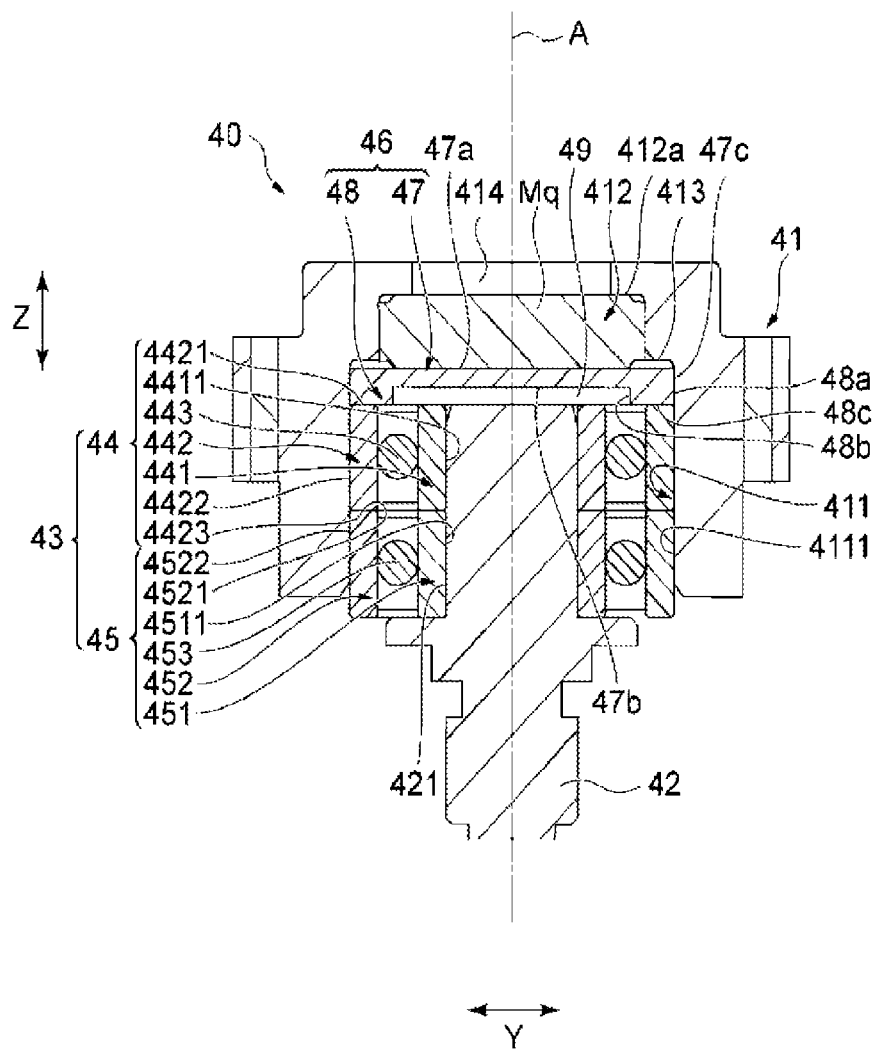
FIG. 10 is a cross-sectional view of a first sub-shaft gear and a member in the vicinity of the first sub-shaft gear in the absolute encoder illustrated in FIG. 9.

FIG. 1 is a perspective view schematically illustrating the configuration of the absolute encoder 2 according to the embodiment of the present invention. FIG. 2 is a perspective view schematically illustrating the configuration of the absolute encoder 2 with a shield plate 7 removed. In FIG. 2, a case 4 and an angle sensor support substrate 5 of the absolute encoder 2 are transparently illustrated. FIG. 3 is a perspective view schematically illustrating the configuration of the absolute encoder 2 with the case 4 removed. In FIG. 3, the angle sensor support substrate 5 of the absolute encoder 2 is transparently illustrated. FIG. 4 is a plan view schematically illustrating the configuration of the absolute encoder 2 with the angle sensor support substrate 5 removed. FIG. 5 is a diagram of the angle sensor support substrate 5 when viewed from the lower side. FIG. 6 is a cross-sectional view of the absolute encoder 2 taken along line A-A. FIG. 7 is a cross-sectional view of the absolute encoder 2 taken along line B-B. FIG. 8 is a cross-sectional view of the absolute encoder 2 taken along line C-C. FIG. 9 is a cross-sectional view of the absolute encoder 2 taken along line D-D. FIG. 10 is a cross-sectional view of the first sub-shaft gear 40 and a member in the vicinity of the first sub-shaft gear 40 in the absolute encoder 2 illustrated in FIG. 9.

As illustrated in FIGS. 9 and 10, the absolute encoder 2 according to the embodiment of the present invention includes the first sub-shaft gear 40 as a sub-shaft gear rotating based on rotation of a main shaft 1a, a bearing part 43 rotatably supporting the first sub-shaft gear 40 around an axial line A, a support shaft 42 as a shaft part supporting the bearing part 43, and a spacer 46 provided between the first sub-shaft gear 40 and the bearing part 43. At least a part of the spacer 46 is formed of a magnetic material, and the spacer 46 is formed extending in a direction intersecting the axial line A. Hereinafter, the structure of the absolute encoder 2 will be described in detail.

As illustrated in FIGS. 1 to 9, the absolute encoder 2 according to the embodiment of the present invention includes a first worm gear part 11, a first worm wheel part 21, a second worm gear part 22, a first sub-shaft gear 40 including a second worm wheel part 41, the support shaft 42, a magnet Mq, and an angle sensor Sq. The first worm gear part 11 is a first driving gear and rotates according to the rotation of the main shaft 1a. The first worm wheel part 21 is a first driven gear, has a central axis orthogonal to a central axis of the first worm gear part 11, and meshes with the first worm gear part 11. The second worm gear part 22 is a second driving gear, is provided coaxially with the first worm wheel part 21, and rotates according to the rotation of the first worm wheel part 21. The second worm wheel part 41 of the first sub-shaft gear 40 is a second driven gear, has a central axis orthogonal to the central axis of the first worm wheel part 21, and meshes with the second worm gear part 22. The support shaft 42 rotatably supports the first sub-shaft gear 40. The magnet Mq is provided as a permanent magnet on the axial line A of the support shaft 42 in the first sub-shaft gear 40. The angle sensor Sq is provided in the vicinity of the magnet Mq in a range allowing detection of a change in the magnetic flux of the magnet Mq, for example, on the axial line A or in the vicinity of the axial line A, and detects, as an angle sensor, the rotation angle of the first sub-shaft gear 40 corresponding to a change in the magnetic flux generated from the magnet Mq.

In the present embodiment, for convenience of explanation, the absolute encoder 2 will be described with reference to an XYZ Cartesian coordinate system. The X-axis direction corresponds to a horizontal left-right direction, the Y-axis direction corresponds to a horizontal front-rear direction, and the Z-axis direction corresponds to a vertical up-down direction. The Y-axis direction and the Z-axis direction are orthogonal to the X-axis direction. In the present description, the X-axis direction is also referred to as the left side or the right side, the Y-axis direction is also referred to as the front side or the rear side, and the Z-axis direction is also referred to as the upper side or the lower side. The absolute encoder 2 illustrated in FIGS. 1 and 2 is orientated such that the left side in the X-axis direction is the left side and the right side in the X-axis direction is the right side. Further, the absolute encoder 2 illustrated in FIGS. 1 and 2 is orientated such that the near side in the Y-axis direction is the front side and the back side in the Y-axis direction is the rear side. Additionally, the absolute encoder 2 illustrated in FIGS. 1 and 2 is orientated such that the upper side in the Z-axis direction is the upper side and the lower side in the Z-axis direction is the lower side. A state when viewed from the upper side in the Z-axis direction is referred to as a plan view, a state when viewed from the front side in the Y-axis direction is referred to as a front view, and a state when viewed from the left side in the X-axis direction is referred to as a side view. The notation for such directions is not intended to limit the usage orientation of the absolute encoder 2, and the absolute encoder 2 may be used in any orientation.

As described above, the absolute encoder 2 is an encoder of an absolute type configured to specify and output the amount of rotation over a plurality of rotations of the main shaft 1a of a motor 1 as illustrated in FIGS. 1 and 2. In the embodiment of the present invention, the absolute encoder 2 is provided at an end portion at the upper side in the Z-axis direction of the motor 1. In the embodiment of the present invention, the absolute encoder 2 has a substantially rectangular shape in plan view, and has a rectangular shape being thin and long in the up-down direction being the extension direction of the main shaft 1a in front view and side view. That is, the absolute encoder 2 has a flat rectangular parallelepiped shape being longer in the horizontal direction than in the up-down direction.

The absolute encoder 2 includes a hollow and angular tubular case 4 accommodating the internal structure. The case 4 includes a plurality of (for example, four) outer wall parts 4a surrounding at least a part of the main shaft 1a of the motor 1, a main shaft gear 10, a first intermediate gear 20, a second intermediate gear 30, a first sub-shaft gear 40, a second sub-shaft gear 50, and the like, and has an open upper end portion. In the case 4, the shield plate 7 serving as a magnetic flux shielding member and being a rectangular plate-shaped member is fixed at the case 4 and a gear base part 3 by substrate mounting screws 8a at the open upper end portions of the four outer wall parts 4a.

The shield plate 7 is a plate-shaped member provided between the angle sensors Sp, Sq, and Sr and the outside of the absolute encoder 2 in the axial direction (Z-axis direction). The shield plate 7 is formed of a magnetic material in order to prevent magnetic interference due to a magnetic flux generated outside the absolute encoder 2 by the angle sensors Sp, Sq, and Sr provided at the inside of the case 4.

The motor 1 may be a stepper motor or a brushless DC motor, for example. As an example, the motor 1 may be a motor employed as a drive source for driving an industrial robot via a reduction mechanism such as strain wave gearing. The main shaft 1a of the motor 1 projects from the case of the motor at both sides in the up-down direction. The absolute encoder 2 outputs the amount of rotation of the main shaft 1a of the motor 1 as a digital signal.

The motor 1 has a substantially rectangular shape in plan view, and also has a substantially rectangular shape in the up-down direction. That is, the motor 1 has a substantially cuboid shape. In plan view, the four outer wall parts constituting the outer shape of the motor 1 each have a length of 25 mm, for example. In other words, the external shape of the motor 1 is a 25 mm square in plan view. The absolute encoder 2 provided in the motor 1 is, for example, a 25 mm square to match the external shape of the motor 1.

In FIGS. 1 and 2, the angle sensor support substrate 5 is provided to cover the inside of the absolute encoder 2 together with the case 4 and the shield plate 7.

As illustrated in FIG. 5, the angle sensor support substrate 5 has a substantially rectangular shape in plan view and is a thin plate-shaped printed wiring substrate in the vertical direction. Furthermore, a connector 6 is connected to the angle sensor support substrate 5 and is for connecting the absolute encoder 2 and an external device (not illustrated).

As illustrated in FIGS. 2, 3, and 4, the absolute encoder 2 includes the main shaft gear 10 having the first worm gear part 11 (first driving gear), and the first intermediate gear 20 having the first worm wheel part 21 (first driven gear), the second worm gear part 22 (second driving gear), and a third worm gear part 28 (third driving gear). The absolute encoder 2 also includes the second intermediate gear 30 having a third worm wheel part 31 (third driven gear) and a first spur gear part 32 (fourth driving gear), a first sub-shaft gear body having the first sub-shaft gear 40 (second driven gear) formed with a second worm wheel part 41 and a support shaft 42 (see FIG. 9), and the second sub-shaft gear 50 having a second spur gear part 51 (third driven gear). The absolute encoder 2 also includes a magnet Mp, the angle sensor Sp corresponding to the magnet Mp, the magnet Mq, the angle sensor Sq corresponding to the magnet Mq, a magnet Mr, the angle sensor Sr corresponding to the magnet Mr, and a microcomputer 121.

As illustrated in FIGS. 4 and 6, the main shaft 1a of the motor 1 is an output shaft of the motor 1 and is an input shaft configured to transmit a rotational force to the absolute encoder 2. The main shaft gear 10 is fixed to the main shaft 1a of the motor 1, and is rotatably supported by a bearing member of the motor 1 integrally with the main shaft 1a. The first worm gear part 11 is provided at the outer periphery of the main shaft gear 10 so as to rotate according to the rotation of the main shaft 1a of the motor 1. In the main shaft gear 10, the first worm gear part 11 is provided so that the central axis of the first worm gear part 11 coincides with or substantially coincides with the central axis of the main shaft 1a. The main shaft gear 10 can be formed of various materials such as a resin material or a metal material. The main shaft gear 10 is formed of, for example, a polyacetal resin.

As illustrated in FIGS. 3 and 4, the first intermediate gear 20 is a gear part configured to transmit the rotation of the main shaft gear 10 to the first sub-shaft gear 40 and the second intermediate gear 30. The first intermediate gear 20 is axially supported by a shaft 23 around a rotation axial line extending substantially parallel to a base part 3b. The first intermediate gear 20 is a substantially cylindrical member extending in the direction of the rotation axial line. The first intermediate gear 20 includes the first worm wheel part 21, the second worm gear part 22, and the third worm gear part 28. A through hole is formed at the inside of the first intermediate gear, and the shaft 23 is inserted into the through hole. The first intermediate gear 20 is axially supported by inserting the shaft 23 into first intermediate gear shaft support parts 3g provided at the base part 3b of the gear base part 3. The first worm wheel part 21, the second worm gear part 22, and the third worm gear part 28 are disposed at positions separated from each other in this order. The first intermediate gear 20 can be formed of various materials such as a resin material or a metal material. The first intermediate gear 20 is formed of, for example, polyacetal resin.

As illustrated in FIGS. 4 and 7, the first worm wheel part 21 is provided at the outer periphery of the first intermediate gear 20. The first worm wheel part 21 is provided to mesh with the first worm gear part 11 and rotate according to the rotation of the first worm gear part 11. The axial angle between the first worm wheel part 21 and the first worm gear part 11 is set to 900 or approximately 90°.

Although there is no special restriction on an outer diameter of the first worm wheel part 21, in the illustrated example, the outer diameter of the first worm wheel part 21 is set to be smaller than the outer diameter of the first worm gear part 11, and the outer diameter of the first worm wheel part 21 is small. As a result, the size of the absolute encoder 2 in the up-down direction is reduced.

The second worm gear part 22 is provided at the outer periphery of the first intermediate gear 20. The second worm gear part 22 rotates with the rotation of the first worm wheel part 21. The second worm gear part 22 meshes with the second worm wheel part 41 of the first sub-shaft gear 40 to rotate the first sub-shaft gear 40. In the first intermediate gear 20, the second worm gear part 22 is provided so that a central axis of the second worm gear part 22 coincides with or substantially coincides with the central axis of the first worm wheel part 21.

As illustrated in FIGS. 4 and 8, the third worm gear part 28 is provided at the outer periphery of the first intermediate gear 20. The third worm gear part 28 rotates with the rotation of the first worm wheel part 21. The third worm gear part 28 meshes with the third worm wheel part 31 of the second intermediate gear 30 to rotate the second intermediate gear 30. In the first intermediate gear 20, the third worm gear part 28 is provided so that a central axis of the third worm gear part 28 coincides with or substantially coincides with the central axis of the first worm wheel part 21.

As illustrated in FIGS. 4 and 9, the first sub-shaft gear 40 is decelerated by the first intermediate gear 20 according to the rotation of the main shaft 1a and rotates integrally with the magnet Mq. The first sub-shaft gear 40 is rotatably supported by the bearing part 43 supported by the support shaft 42 around the axial line A. As illustrated in FIG. 10, the first sub-shaft gear 40 is a cylindrical or substantially cylindrical member extending along the axial line A. The first sub-shaft gear 40 can be formed of various materials such as a resin material or a metal material. The first sub-shaft gear 40 is formed of, for example, polyacetal resin. The first sub-shaft gear 40 includes the second worm wheel part 41, a bearing accommodating part 411 as an accommodating part, a magnet holding part 412, and a step part 413.

The second worm wheel part 41 is provided at an outer periphery of the first sub-shaft gear 40 and is provided to mesh with the second worm gear part 22 and rotate according to the rotation of the second worm gear part 22. An axial angle between the second worm wheel part 41 and the second worm gear part 22 is set to 90° or approximately 90°. The rotation axial line (axial line A) of the second worm wheel part 41 is parallel or substantially parallel to the rotation axial line of the first worm gear part 11.

The bearing accommodating part 411 forms a space capable of accommodating the bearing part 43, and the space formed by the bearing accommodating part 411 has a columnar shape or a substantially columnar shape extending along the axial line A. The bearing accommodating part 411 is open at one side in the direction along the axial line A, specifically at the lower side in the Z-axis direction in FIGS. 9 and 10. A dimension in a radial direction (a direction perpendicular to the axial line A, the X-axis direction, and the Y-axis direction) of an inner peripheral part 4111 being an inner peripheral surface of the bearing accommodating part 411 is a dimension such that the bearing part 43 is fitted by being press-fitted. The inner peripheral part 4111 is a portion extending along the axial line A of the bearing accommodating part 411, and is a portion having a cylindrical surface shape or a substantially cylindrical surface shape. The dimension of the bearing accommodating part 411 in the direction of the axial line A (Z-axis direction) is set to a dimension capable of accommodating the bearing part 43 in the direction of the axial line A. The bearing accommodating part 411 is provided with the step part 413. The step part 413 is an annular surface being parallel or substantially parallel to the X axis and the Y axis and centered on the axial line A at the other side in the direction along the axial line A, specifically, at the upper side in the Z-axis direction in FIGS. 9 and 10. For example, in a case where the diameter of the magnet Mq and the diameter of the bearing part 43 are the same or substantially the same, the first sub-shaft gear 40 may not include the step part 413.

The magnet holding part 412 forms a space capable of accommodating the magnet Mq in the first sub-shaft gear 40, and the space formed by the magnet holding part 412 has a columnar shape or a substantially columnar shape extending along the axial line A. A space formed by the magnet holding part 412 communicates with a space formed by the bearing accommodating part 411. The magnet holding part 412 is provided closer to the other side in the direction along the axial line A than the step part 413, specifically, at the upper side in the Z-axis direction in FIGS. 9 and 10. The magnet holding part 412 is formed holding the magnet Mq in a hollow portion formed at the magnet holding part 412. Further, the first sub-shaft gear 40 is formed with a through hole 414 penetrating the first sub-shaft gear 40 in the direction of the axial line A and communicates with the magnet holding part 412. The through hole 414 forms a space, and the magnetic flux of the magnet Mq attached to the first sub-shaft gear 40 passes through the space to the angle sensor Sq side.

The support shaft 42 rotatably supports the first sub-shaft gear 40 via the bearing part 43. The support shaft 42 protrudes vertically or substantially vertically from the base part 3b of the gear base part 3.

The bearing part 43 has at least one bearing, and in the absolute encoder 2, as illustrated in FIG. 10, the bearing part 43 has two rolling bearings of a first bearing 44 and a second bearing 45. The bearing part 43 may include one bearing, or may include three or more bearings.

The first bearing 44 includes an inner ring 441, an outer ring 442, and rolling elements 443. The inner ring 441 is an annular member having an inner peripheral part 4411 fittable to an outer peripheral part 421 being an outer peripheral surface of the support shaft 42. The inner peripheral part 4411 is a surface facing the inner peripheral side of the inner ring 441. The outer ring 442 is provided at the outer peripheral side of the inner ring 441. The outer ring 442 is an annular member being coaxial or substantially coaxial with the inner ring 441 and having a larger diameter than the inner ring 441. The rolling elements 443 are a plurality of spherical members disposed between the inner ring 441 and the outer ring 442. The inner ring 441 is press-fitted to the outer peripheral part 421 of the support shaft 42, whereby the first bearing 44 is fixed to the support shaft 42. A cylindrical part 4422 of the outer ring 442 is press-fitted to the inner peripheral part 4111 of the bearing accommodating part 411 of the first sub-shaft gear 40, whereby the first bearing 44 is fixed to the second sub-shaft gear 50. The cylindrical part 4422 is a surface facing the outer peripheral side of the outer ring 442. The first bearing 44 is configured such that, in the absolute encoder 2, a disk part 4421 at the upper side in the direction of the axial line A (Z-axis direction) of the outer ring 442 comes into contact with the spacer 46 as described below. The disk part 4421 is a surface facing the upper side of the outer ring 442. In this manner, the first bearing 44 is accurately fixed to the first sub-shaft gear 40 and the support shaft 42 in the direction of the axial line A and the radial direction.

The second bearing 45 includes an inner ring 451, an outer ring 452, and rolling elements 453. The inner ring 451 is an annular member having an inner peripheral part 4511 fittable to the outer peripheral part 421 of the support shaft 42. The inner peripheral part 4511 is a surface facing the inner peripheral side of the inner ring 451. The outer ring 452 is provided at the outer peripheral side of the inner ring 451. The outer ring 452 is an annular member being coaxial or substantially coaxial with the inner ring 451 and having a larger diameter than the inner ring 451. The rolling elements 453 are a plurality of spherical members disposed between the inner ring 451 and the outer ring 452. The inner ring 451 is press-fitted to the outer peripheral part 421 of the support shaft 42, whereby the second bearing 45 is fixed to the support shaft 42. In the second bearing 45, a disk part 4521 at the upper side in the direction of the axial line A (Z-axis direction) of the outer ring 452 is in contact with a disk part 4423 at the lower side of the outer ring 442 of the first bearing 44. The disk part 4521 is a surface facing the upper side of the outer ring 452, and the disk part 4423 is a surface facing the lower side of the outer ring 442 of the first bearing 44. A cylindrical part 4522 of the outer ring 452 is press-fitted to the inner peripheral part 4111 of the bearing accommodating part 411 of the first sub-shaft gear 40, whereby the second bearing 45 is fixed to the second sub-shaft gear 50. The cylindrical part 4522 is a surface facing the outer peripheral side of the outer ring 442.

As described above, at least a part of the spacer 46 is formed of a magnetic material, and in the absolute encoder 2, the entire spacer 46 is formed of a magnetic material. The magnetic material forming the spacer 46 is, for example, carbon steel, martensitic SUS, ferritic SUS, or the like. The magnetic material forming the spacer 46 may be another magnetic material.

Figure 11:
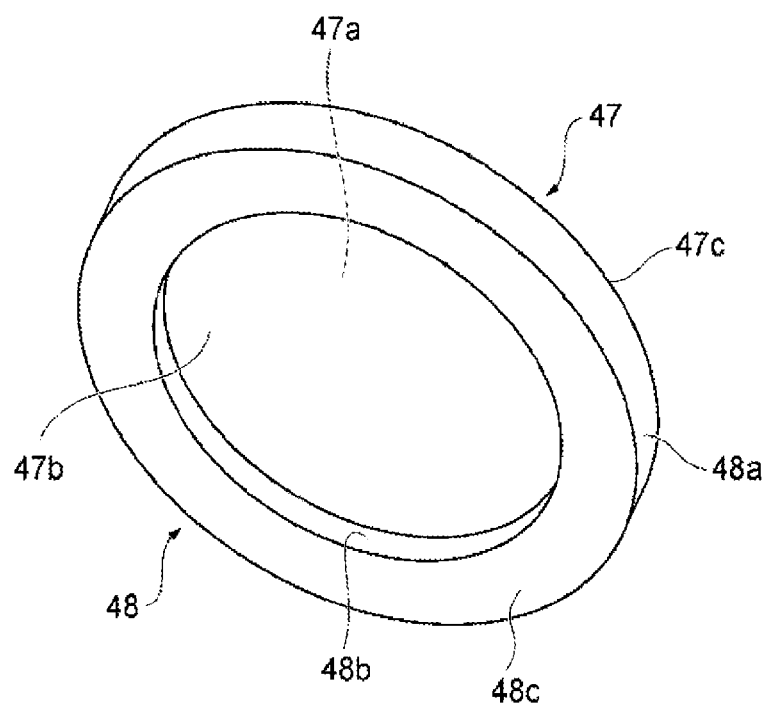
FIG. 11 is a perspective view of a spacer illustrated in FIG. 10.

As described above, the spacer 46 has a shape expanding in the direction intersecting the axial line A, and is, for example, a plate-shaped member. Specifically, as illustrated in FIGS. 10 and 11, the spacer 46 is a substantially disk-shaped member. The spacer 46 has a plate-shaped part 47 and a ring part 48. The plate-shaped part 47 is a portion extending along a plane and has a pair of surfaces (an upper surface 47a and a lower surface 47b). The pair of the upper surface 47a and the lower surface 47b are, for example, parallel or substantially parallel to each other. The ring part 48 is an annular portion and protrudes from one of the pair of the upper surface 47a and the lower surface 47b of the plate-shaped part 47. In the illustrated example, the ring part 48 protrudes downward from the lower surface 47b of the plate-shaped part 47.

To be more specific, as illustrated in FIGS. 10 and 11, the plate-shaped part 47 has a flat plate shape, and the upper surface 47a and the lower surface 47b facing away from each other extend along a plane orthogonal to the axial line A in the absolute encoder 2, for example, extend parallel or substantially parallel to the plane orthogonal to the axial line A. In addition, the plate-shaped part 47 is disk-shaped or substantially disk-shaped, and an outer peripheral surface 47c being a surface facing the outer peripheral side is a cylindrical surface or a substantially cylindrical surface, and in the absolute encoder 2, is a cylindrical surface or a substantially cylindrical surface extending along the axial line A.

Specifically, as illustrated in FIGS. 10 and 11, the ring part 48 has a cylindrical shape or a substantially cylindrical shape. The ring part 48 has an outer peripheral surface 48a being a surface facing the outer peripheral side, an inner peripheral surface 48b being a surface facing the inner peripheral side, and a lower end surface 48c being a surface facing the extending direction of the ring part 48. The lower end surface 48c connects the outer peripheral surface 48a and the inner peripheral surface 48b to each other at their lower ends. The lower end surface 48c extends along the upper surface 47a of the plate-shaped part 47, and for example, extends parallel or substantially parallel to the upper surface 47a of the plate-shaped part 47. In the absolute encoder 2, the lower end surface 48c of the ring part 48 has a size such that the lower end surface 48c is in contact with the disk part 4421 of the outer ring 442 of the first bearing 44 and is not in contact with the inner ring 441 of the first bearing 44.

As described above, the entire spacer 46 is formed of a magnetic material, and the plate-shaped part 47 and the ring part 48 are integrated with each other. That is, the plate-shaped part 47 and the ring part 48 are parts of the spacer 46 integrally formed of the same magnetic material.

As illustrated in FIGS. 10 and 11, the outer peripheral surface 47c of the plate-shaped part 47 and the outer peripheral surface 48a of the ring part 48 are flush with each other, and no step is formed between the outer peripheral surface 47c of the plate-shaped part 47 and the outer peripheral surface 48a of the ring part 48. The outer peripheral surface 47c of the plate-shaped part 47 and the outer peripheral surface 48a of the ring part 48 may not be flush with each other, and a step may be formed between the outer peripheral surface 47c of the plate-shaped part 47 and the outer peripheral surface 48a of the ring part 48. In this case, the outer peripheral surface 47c of the plate-shaped part 47 may be located at the inner peripheral side of the outer peripheral surface 48a of the ring part 48, or the outer peripheral surface 47c of the plate-shaped part 47 may be located at the outer peripheral side of the outer peripheral surface 48a of the ring part 48.

The ring part 48 and the plate-shaped part 47 form a recess part 49 being a columnar or substantially columnar space in the spacer 46. To be specific, the recess part 49 is a space defined by the inner peripheral surface 48b of the ring part 48 and the lower surface 47b of the plate-shaped part 47, and opens downward. The lower end surface 48c of the ring part 48 forms an opening of the recess part 49. As described above, in the absolute encoder 2, the lower end surface 48c of the ring part 48 has a size such that the lower end surface 48c is in contact with the disk part 4421 of the outer ring 442 of the first bearing 44 and is not in contact with the inner ring 441 of the first bearing 44. In the absolute encoder 2, the recess part 49 faces the inner ring 441 in the direction of the axial line A.

Further, the spacer 46 can be fitted into the bearing accommodating part 411. That is, in the bearing accommodating part 411, the outer peripheral surface 47c of the plate-shaped part 47 and the outer peripheral surface 48a of the ring part 48 of the spacer 46 are pressed against the inner peripheral part 4111 of the bearing accommodating part 411, whereby the spacer 46 is fixed to the bearing accommodating part 411. When a step is formed between the outer peripheral surface 47c of the plate-shaped part 47 and the outer peripheral surface 48a of the ring part 48, the outer peripheral surface 47c of the plate-shaped part 47 or the outer peripheral surface 48a of the ring part 48 of the spacer 46 is pressed against the inner peripheral part 4111 of the bearing accommodating part 411 in the bearing accommodating part 411, whereby the spacer 46 is fixed to the bearing accommodating part 411. The spacer 46 may be accommodated in the bearing accommodating part 411 with a gap between the spacer 46 and the inner peripheral part 4111 of the bearing accommodating part 411.

With the above-described configuration, in the absolute encoder 2, the plurality of bearings (the first bearing 44 and the second bearing 45) included in the bearing part 43 are press-fitted and fixed to the bearing accommodating part 411, and thus the first sub-shaft gear 40 is accurately fixed at the support shaft 42 in the direction along the axial line A and the radial direction.

The magnet Mq is a permanent magnet provided on the axial line A of the support shaft 42 at the distal end side (the upper side in the Z-axis direction) of the first sub-shaft gear 40. The magnet Mq is accommodated in the magnet holding part 412 and is fitted to the magnet holding part 412 in the radial direction. The magnet holding part 412 may not be formed such that the magnet Mq is fitted in the magnet holding part 412. In the absolute encoder 2, the magnet Mq is held on the upper surface 47a of the plate-shaped part 47 of the spacer 46, and is fixed to the first sub-shaft gear 40 in the axial line A direction. The angle sensor Sq is provided on the axial line A similarly to the magnet Mq in the absolute encoder 2. The angle sensor Sq detects a change in the magnetic flux generated from the magnet Mq.

In FIGS. 4 and 8, the second intermediate gear 30 is a disk-shaped gear part configured to rotate according to the rotation of the main shaft 1a, decelerate the rotation of the main shaft 1a, and transmit the decelerated rotation to the second sub-shaft gear 50. The second intermediate gear 30 is provided between the second worm gear part 22 and the second spur gear part 51 provided at the second sub-shaft gear 50. The second spur gear part 51 meshes with the first spur gear part 32. The second intermediate gear 30 includes the third worm wheel part 31 configured to mesh with the third worm gear part 28 of the first intermediate gear 20, and the first spur gear part 32 configured to drive the second spur gear part 51. The second intermediate gear 30 is formed of, for example, a polyacetal resin. The second intermediate gear 30 is a substantially circular member in plan view. The second intermediate gear 30 is axially supported by the base part 3b of the gear base part 3.

The providing of the second intermediate gear 30 enables the second sub-shaft gear 50 to be described below to be disposed at a position away from the third worm gear part 28. Therefore, the distance between the magnets Mp and Mq can be increased to reduce an influence of a leakage flux on the magnets Mp and Mq. Furthermore, the providing of the second intermediate gear 30 enables the expansion of the range allowing the reduction ratio to be set, improving the degree of freedom in design.

The third worm wheel part 31 is provided at an outer periphery of the second intermediate gear 30 and is provided to mesh with the third worm gear part 28 and rotate according to the rotation of the third worm gear part 28. The first spur gear part 32 is provided at the outer periphery of the second intermediate gear 30 so that a central axis of the first spur gear part 32 coincides with or substantially coincides with a central axis of the third worm wheel part 31. The first spur gear part 32 is provided to mesh with the second spur gear part 51 and rotate according to the rotation of the third worm wheel part 31. A rotation axial line of the third worm wheel part 31 and the first spur gear part 32 is provided parallel or substantially parallel to the rotation axial line of the first worm gear part 11.

In FIG. 8, the second sub-shaft gear 50 is a gear part having a circular shape in plan view, rotates according to the rotation of the main shaft 1a, decelerates the rotation of the main shaft 1a, and transmits the decelerated rotation to the magnet Mr. The second sub-shaft gear 50 is axially supported around a rotation axial line extending substantially vertically from the base part 3b of the gear base part 3. The second sub-shaft gear 50 includes the second spur gear part 51 and a magnet holding part configured to hold the magnet Mr.

The second spur gear part 51 is provided at the outer periphery of the second sub-shaft gear 50. The second spur gear part 51 is provided to mesh with the first spur gear part 32 and rotate according to the rotation of the third worm wheel part 31. A rotation axial line of the second spur gear part 51 is provided parallel or substantially parallel to the rotation axial line of the first spur gear part 32. The second sub-shaft gear 50 can be formed of various materials such as a resin material or a metal material. The second sub-shaft gear 50 is formed of, for example, polyacetal resin.

Hereinafter, a direction of the first worm wheel part 21 opposing the first worm gear part 11 to mesh with the first worm gear part 11 is referred to as a first meshing direction P1 (direction of arrow P1 in FIG. 4). Similarly, a direction of the second worm gear part 22 opposing the second worm wheel part 41 to mesh with the second worm wheel part 41 is referred to as a second meshing direction P2 (direction of arrow P2 in FIG. 4). Moreover, a direction of the third worm gear part 28 opposing the third worm wheel part 31 to mesh with the third worm wheel part 31 is referred to as a third meshing direction P3 (direction of arrow P3 in FIG. 4). In the present embodiment, the first meshing direction P1, the second meshing direction P2, and the third meshing direction P3 are all directions along a horizontal plane (XY plane).

The magnet Mp is fixed to an upper surface of the main shaft gear 10 such that the central axes of both the magnet Mp and the main shaft gear 10 coincide or substantially coincide with each other. The magnet Mp is supported by a magnet support part 17 provided at a central axis of the main shaft gear 10 via a holder part 16. The holder part 16 is formed of a non-magnetic material such as an aluminum alloy. An inner peripheral surface of the holder part 16 is formed, for example, in an annular shape corresponding to an outer diameter of the magnet Mp and the shape of an outer peripheral surface of the magnet Mp so as to be in contact with the outer peripheral surface of the magnet Mp in a radial direction and to hold the outer peripheral surface. Furthermore, an inner peripheral surface of the magnet support part 17 is formed, for example, in an annular shape corresponding to an outer diameter of the holder part 16 and the shape of an outer peripheral surface of the holder part 16 so as to be in contact with the outer peripheral surface of the holder part 16. The magnet Mp has 2-pole magnetic poles arranged in a direction perpendicular to a rotation axial line of the main shaft gear 10. In order to detect a rotation angle of the main shaft gear 10, the angle sensor Sp is provided at a lower surface 5a of the angle sensor support substrate 5 so that a lower surface of the angle sensor Sp opposes the upper surface of the magnet Mp in the vertical direction via a gap.

As an example, the angle sensor Sp is fixed to an angle sensor support substrate 5 supported by a substrate post 110 disposed at the gear base part 3 of the absolute encoder 2. The angle sensor Sp detects the magnetic pole of the magnet Mp, and outputs detection information to the microcomputer 121. The microcomputer 121 specifies the rotation angle of the main shaft gear 10, that is, a rotation angle of the main shaft 1a, by specifying a rotation angle of the magnet Mp on the basis of the received magnetic pole-related detection information. The resolution of the rotation angle of the main shaft 1a corresponds to the resolution of the angle sensor Sp. As will be described below, the microcomputer 121 specifies the amount of rotation of the main shaft 1a on the basis of a specified rotation angle of the first sub-shaft gear 40 and the specified rotation angle of the main shaft 1a, and outputs the specified amount of rotation. As an example, the microcomputer 121 may output the amount of rotation of the main shaft 1a of the motor 1 as a digital signal.

The angle sensor Sq detects the rotation angle of the second worm wheel part 41, that is, the rotation angle of the first sub-shaft gear 40. The magnet Mq is fixed at an upper surface of the first sub-shaft gear 40 such that the central axes of both the magnet Mq and the first sub-shaft gear 40 coincide or substantially coincide with each other. The magnet Mq has two magnetic poles arranged in a direction perpendicular to the rotation axial line (axial line A) of the first sub-shaft gear 40. As illustrated in FIG. 3, in order to detect the rotation angle of the first sub-shaft gear 40, the angle sensor Sq is provided so that a lower surface of the angle sensor Sq opposes an upper surface of the magnet Mq in the vertical direction via a gap.

As an example, the angle sensor Sq is fixed at the angle sensor support substrate 5 at the same surface as the surface where the angle sensor Sp is fixed, the angle sensor Sp being fixed at the angle sensor support substrate 5. The angle sensor Sq detects the magnetic pole of the magnet Mq, and outputs detection information to the microcomputer 121. The microcomputer 121 specifies a rotation angle of the magnet Mq, that is, the rotation angle of the first sub-shaft gear 40, on the basis of the received magnetic pole-related detection information.

The angle sensor Sr detects a rotation angle of the second spur gear part 51, that is, a rotation angle of the second sub-shaft gear 50. The magnet Mr is fixed at an upper surface of the second sub-axis gear 50 such that the central axes of both the magnet Mr and the second sub-shaft gear 50 coincide or substantially coincide with each other. The magnet Mr has 2-pole magnetic poles arranged in a direction perpendicular to a rotation axial line of the second sub-shaft gear 50. As illustrated in FIG. 3, in order to detect the rotation angle of the second sub-shaft gear 50, the angle sensor Sr is provided so that a lower surface of the angle sensor Sr opposes an upper surface of the magnet Mr in the vertical direction via a gap.

As an example, the angle sensor Sr is fixed to the angle sensor support substrate 5 supported by the substrate post 110 disposed at the gear base part 3 of the absolute encoder 2. The angle sensor Sr detects the magnetic pole of the magnet Mr, and outputs detection information to the microcomputer 121. The microcomputer 121 specifies a rotation angle of the magnet Mr, that is, the rotation angle of the second sub-shaft gear 50, on the basis of the received magnetic pole-related detection information.

A magnetic angle sensor having a relatively high resolution may be used for each magnetic sensor. The magnetic angle sensor is disposed opposing an end face including magnetic poles of each permanent magnet in the axial direction of each rotating body via a certain gap, specifies a rotation angle of an opposing rotating body on the basis of the rotation of these magnetic poles, and outputs a digital signal. Examples of the magnetic angle sensor include a detection element configured to detect a magnetic pole and an arithmetic circuit configured to output a digital signal on the basis of the output of the detection element. The detection element may include, for example, a plurality of (for example, four) magnetic field detection elements such as a Hall element or a giant magneto-resistive (GMR) element.

The arithmetic circuit may specify, for example, a rotation angle by table processing using a look-up table using, as a key, the difference or ratio of the outputs of the plurality of detection elements. The detection element and the arithmetic circuit may be integrated on one IC chip. This IC chip may be embedded in a resin having a thin rectangular parallelepiped outer shape. Each magnetic sensor outputs an angle signal to the microcomputer 121 as a digital signal corresponding to the rotation angle of each rotating body detected via a wiring member (not illustrated). For example, each magnetic sensor outputs the rotation angle of each rotating body as a digital signal of multiple bits (for example, 7 bits).

Figure 12:
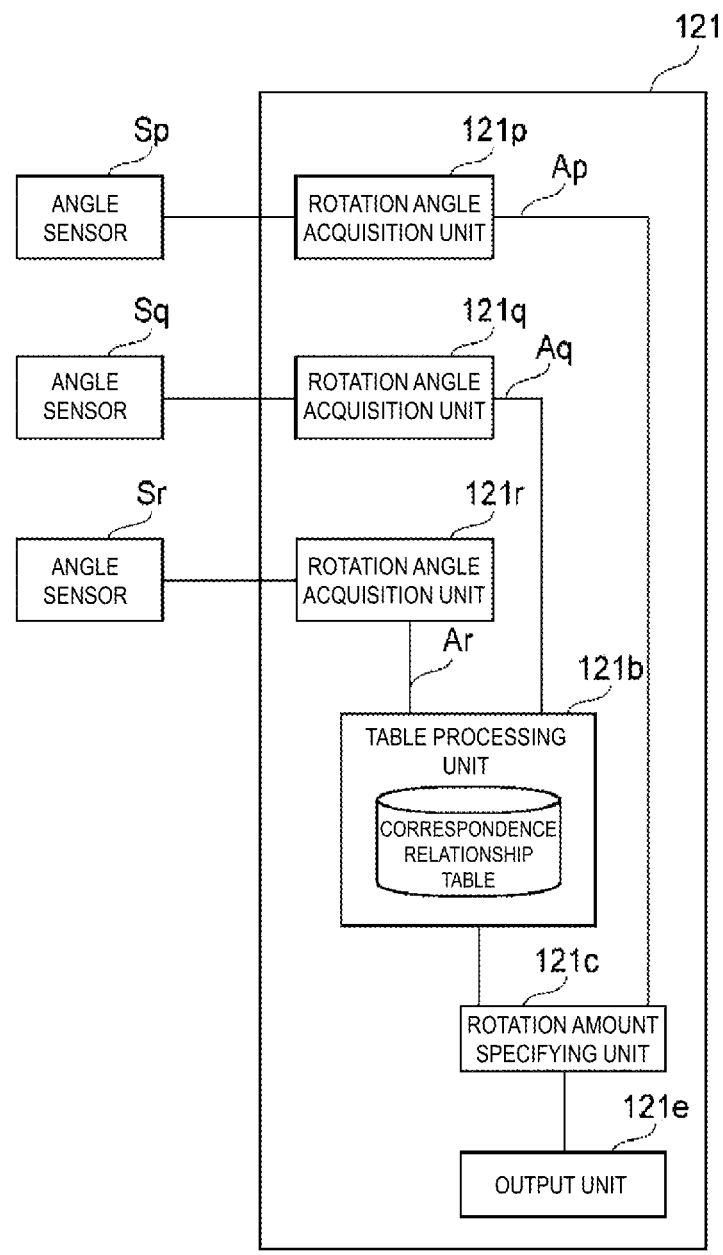
FIG. 12 is a block diagram schematically illustrating a functional configuration of the absolute encoder illustrated in FIG. 1.

FIG. 12 is a block diagram schematically illustrating a functional configuration of the absolute encoder. As illustrated in FIG. 12, a microcomputer 121 is fixed at a surface of the angle sensor support substrate 5 at the base part 3b side of the gear base part 3, by a method such as soldering or bonding. The microcomputer 121 includes a CPU, acquires the digital signal output from each of the angle sensors Sp, Sq, and Sr and representing the rotation angle, and calculates the amount of rotation of the main shaft gear 10. Each block of the microcomputer 121 illustrated in FIG. 12 represents a function realized by the CPU as the microcomputer 121 executing a program. Each block of the microcomputer 121 can be implemented by an element or a mechanical device such as a central processing unit (CPU) or a random access memory (RAM) of a computer, in terms of hardware, and is implemented by a computer program or the like in terms of software, but in the present specification, function blocks implemented by cooperation of hardware and software are drawn. Accordingly, it is understood by those skilled in the art who have read the present specification that these functional blocks can be implemented in various forms by combining hardware and software.

The microcomputer 121 includes a rotation angle acquisition unit 121p, a rotation angle acquisition unit 121q, a rotation angle acquisition unit 121r, a table processing unit 121b, a rotation amount specifying unit 121c, and an output unit 121e. The rotation angle acquisition unit 121p acquires a rotation angle Ap as angle information indicating the rotation angle of the main shaft gear 10, that is, the main shaft 1a, on the basis of a signal output from the angle sensor Sp. The rotation angle acquisition unit 121q acquires a rotation angle Aq as angle information indicating the rotation angle of the first sub-shaft gear 40 on the basis of a signal output from the angle sensor Sq. The rotation angle acquisition unit 121r acquires a rotation angle Ar as angle information indicating the rotation angle of the second sub-shaft gear 50 detected by the angle sensor Sr.

The table processing unit 121b refers to a first correspondence relationship table with the rotation angle Aq and the number of rotations of the main shaft gear 10 corresponding to the rotation angle Aq stored, and specifies the number of rotations of the main shaft gear 10 corresponding to the acquired rotation angle Aq. Furthermore, the table processing unit 121b refers to a second correspondence relationship table with the rotation angle Ar and the number of rotations of the main shaft gear 10 corresponding to the rotation angle Ar stored, and specifies the number of rotations of the main shaft gear 10 corresponding to the acquired rotation angle Ar.

The rotation amount specifying unit 121c specifies a first amount of rotation over a plurality of rotations of the main shaft gear 10 according to the number of rotations of the main shaft gear 10 specified by the table processing unit 121*b* and the acquired rotation angle Ap. The output unit 121*e* converts the amount of rotation of the main shaft gear 10 specified by the rotation amount specifying unit 121*c* over the plurality of rotations into information indicating the amount of rotation, and outputs the information.

The table processing unit 121*b*, the rotation amount specifying unit 121*c*, and the output unit 121*e* also function as an angle position information output unit configured to output angle position information of the first worm gear part 11 to an external control device (controller). Furthermore, the table processing unit 121*b*, the rotation amount specifying unit 121*c*, and the output unit 121*e* also output angle error information for correcting the angle position information of the first worm gear part 11 to the external control device.

The absolute encoder 2 configured in this way can specify the number of rotations of the main shaft 1*a* according to the rotation angles of the first sub-shaft gear 40 and the second sub-shaft gear 50 specified on the basis of the detection information of the angle sensors Sq and Sr, and specify the rotation angle of the main shaft 1*a* on the basis of the detection information of the angle sensor Sp. Then, the microcomputer 121 specifies the amount of rotation of the main shaft 1*a* over multiple rotations on the basis of the specified number of rotations of the main shaft 1*a* and the specified rotation angle of the main shaft 1*a*.

The number of rows of the first worm gear part 11 of the main shaft gear 10 provided at the main shaft 1*a* is, for example, 1, and the number of teeth of the first worm wheel part 21 is, for example, 20. That is, the first worm gear part 11 and the first worm wheel part 21 constitute a first transmission mechanism having a reduction ratio of 20 (=20/1) (see FIG. 4). When the first worm gear part 11 rotates 20 times, the first worm wheel part 21 rotates once. Since the first worm wheel part 21 and the second worm gear part 22 are provided coaxially to form the first intermediate gear 20 and rotate integrally, when the first worm gear part 11 rotates 20 times, that is, when the main shaft 1*a* and the main shaft gear 10 rotate 20 times, the first intermediate gear 20 rotates once and the second worm gear part 22 rotates once.

The number of rows of the second worm gear part 22 is, for example, 5, and the number of teeth of the second worm wheel part 41 is, for example, 25. That is, the second worm gear part 22 and the second worm wheel part 41 constitute a second transmission mechanism having a reduction ratio of 5 (=25/5) (see FIG. 4). When the second worm gear part 22 rotates five times, the second worm wheel part 41 rotates once. Since the first sub-shaft gear 40 formed by the second worm wheel part 41 rotates integrally with the magnet Mq, when the second worm gear part 22 constituting the first intermediate gear 20 rotates five times, the magnet Mq rotates once. From the above, when the main shaft 1*a* rotates 100 times, the first intermediate gear 20 rotates five times and the first sub-shaft gear 40 and the magnet Mq rotate once. That is, the number of rotations for 50 rotations of the main shaft 1*a* can be specified by detection information of the angle sensor Sq regarding the rotation angle of the first sub-shaft gear 40.

The number of rows of the third worm gear part 28 is, for example, 1, and the number of teeth of the third worm wheel part 31 is, for example, 30. That is, the third worm gear part 28 and the third worm wheel part 31 constitute a third transmission mechanism having a reduction ratio of 30 (=30/1) (see FIG. 4). When the third worm gear part 28 rotates 30 times, the third worm wheel part 31 rotates once.

The second intermediate gear 30 formed by the third worm wheel part 31 is provided with the first spur gear part 32 having the central axis coinciding with or substantially coinciding with the central axis of the third worm wheel part 31. Therefore, when the third worm wheel part 31 rotates, the first spur gear part 32 also rotates. Since the first spur gear part 32 meshes with the second spur gear part 51 provided at the second sub-shaft gear 50, when the second intermediate gear 30 rotates, the second sub-shaft gear 50 also rotates.

The number of teeth of the second spur gear part 51 is, for example, 40, and the number of teeth of the first spur gear part 32 is, for example, 24. That is, the first spur gear part 32 and the second spur gear part 51 constitute a fourth transmission mechanism having a reduction ratio of 5/3 (=40/24) (see FIG. 4). When the first spur gear part 32 rotates five times, the second spur gear part 51 rotates three times. Since the second sub-shaft gear 50 formed by the second spur gear part 51 rotates integrally with the magnet Mr as will be described below, when the third worm gear part 28 constituting the first intermediate gear 20 rotates five times, the magnet Mr rotates once. From the above, when the main shaft 1*a* rotates 1,000 times, the first intermediate gear 20 rotates 50 times, the second intermediate gear 30 rotates 5/3 times, and the second sub-shaft gear 50 and the magnet Mr rotate once. That is, the number of rotations for 1,000 rotations of the main shaft 1*a* can be specified by detection information of the angle sensor Sr regarding the rotation angle of the second sub-shaft gear 50.

Operation of Absolute Encoder

Hereinafter, the operation of the absolute encoder 2 is described.

The absolute encoder 2 has the above-described configuration, and as illustrated in FIG. 10, in the absolute encoder 2, the first sub-shaft gear 40 accommodates the magnet Mq, the spacer 46, and the bearing part 43 in the first sub-shaft gear 40, and is rotatably supported by the support shaft 42 protruding from the base part 3*b* of the gear base part 3 via the bearing part 43.

Specifically, as illustrated in FIG. 10, the magnet Mq is accommodated in the magnet holding part 412 of the first sub-shaft gear 40, and is attached to the first sub-shaft gear 40 such that the central axial line of the magnet Mq overlaps with or substantially overlaps with the axial line A. The spacer 46 is accommodated in the bearing accommodating part 411 of the first sub-shaft gear 40 at the lower side of the magnet Mq, and the upper surface 47*a* of the spacer 46 is in contact with the lower surface of the magnet Mq to support the magnet Mq in the direction of the axial line A. In addition, the upper surface 47*a* of the spacer 46 faces the step part 413 formed at the bearing accommodating part 411 of the first sub-shaft gear 40 with a clearance at the end portion at the outer peripheral side. The step part 413 may be formed such that the upper surface 47*a* of the spacer 46 is in contact with the step part 413 of the bearing accommodating part 411.

Each of the first bearing 44 and the second bearing 45 of the bearing part 43 is fixed to the bearing accommodating part 411 of the first sub-shaft gear 40 by press-fitting the outer ring 442, 452 into the bearing accommodating part 411 of the first sub-shaft gear 40. Further, the first bearing 44 and the second bearing 45 are fixed to the support shaft 42 by press-fitting the support shaft 42 into the inner ring 441, 451. The disk part 4421 of the outer ring 442 of the first bearing 44 is in contact with the lower end surface 48*c* of the ring part 48 of the spacer 46, and supports the spacer 46 in the direction of the axial line A. The magnet Mq and the spacer 46 are sandwiched between a bottom surface 412a of the magnet holding part 412 of the first sub-shaft gear 40 and the outer ring 442 of the first bearing 44 of the bearing part 43, and are held in the first sub-shaft gear 40 in the direction of the axial line A.

The inner ring 441 of the first bearing 44 faces the recess part 49 of the spacer 46 in the direction of the axial line A. Therefore, the inner ring 441 of the first bearing 44 does not interfere with the spacer 46, and interference due to relative rotation between the first sub-shaft gear 40 and the first bearing 44 is prevented.

As described above, inside the first sub-shaft gear 40, the magnet Mq is adjacent to the bearing part 43 via the spacer 46 made of a magnetic material. Therefore, the magnetic flux emitted from the magnet Mq passes through the spacer 46, is guided by the spacer 46, and advances to the inner peripheral side or the outer peripheral side in the spacer 46. Thus, even if the material of the first bearing 44 and the second bearing 45 is a magnetic material, the magnetic flux from the magnet Mq is prevented from entering the first bearing 44 and the second bearing 45. Therefore, the magnetic flux emitted from the magnet Mq is prevented from forming a magnetic path in the first bearing 44 and the second bearing 45 having a complicated structure, and the magnetic path of the magnetic flux of the magnet Mq is prevented from forming a complicated magnetic path. As a result, the magnetic flux distribution of the magnet Mq on the angle sensor Sq side is stabilized, a change in the magnetic flux of the magnet Mq detected by the angle sensor Sq in a predetermined rotation period is stabilized for each period, and the detection accuracy of the rotation angle of the magnet Mq by the angle sensor Sq is increased. Therefore, the detection accuracy of the amount of rotation of the main shaft 1a of the absolute encoder 2 is increased.

As described above, in order to prevent the magnetic flux generated from the magnet Mq from passing through the first bearing 44 and the second bearing 45 made of a magnetic material as a magnetic path, the extent of the spacer 46 in the radial direction is preferably the same as the extent of the first bearing 44 and the second bearing 45 in the radial direction, or the spacer 46 is preferably wider in the radial direction than the first bearing 44 and the second bearing 45.

As described above, according to the absolute encoder 2 of the embodiment of the present invention, it is possible to suppress deterioration in the detection accuracy of the rotation angle of the magnet Mq even when a member located in the vicinity of the magnet Mq is made of a magnetic material.

Modification of First Sub-Shaft Gear

Next, a modification of the spacer 46 of the first sub-shaft gear 40 in the absolute encoder 2 described above will be described.

Figure 13:
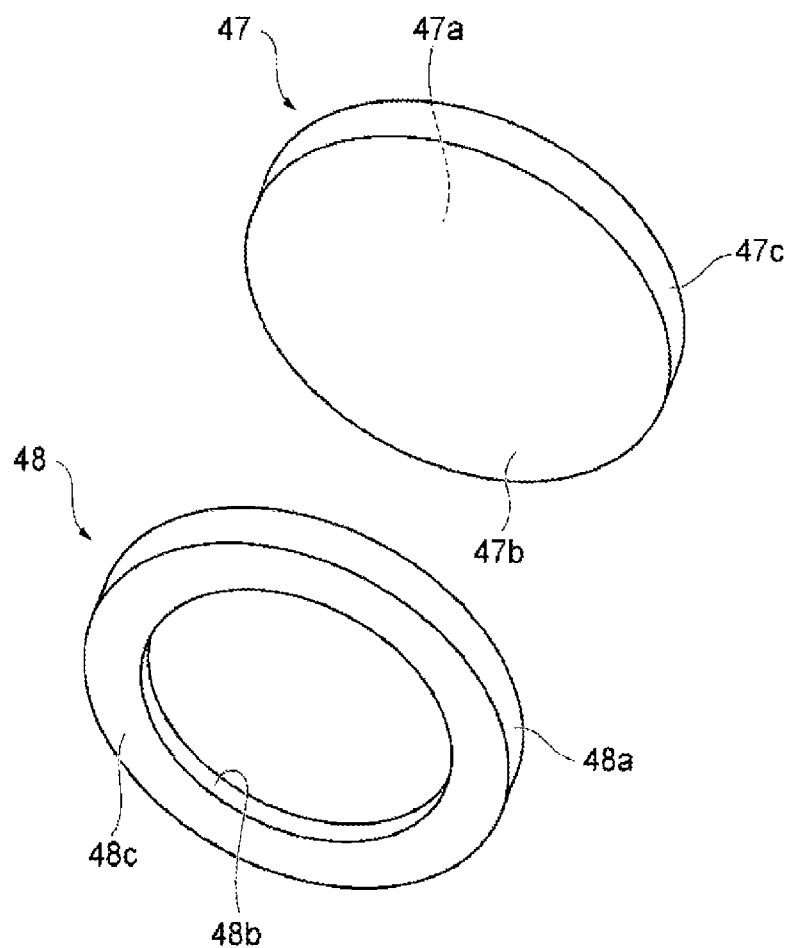
FIG. 13 is a perspective view of a modification of the spacer in the absolute encoder illustrated in FIG. 9.

As illustrated in FIG. 13, a spacer 46B according to the present modification is different from the above-described spacer 46 in that the plate-shaped part 47 and the ring part 48 are not integrated with each other but are separate from each other. In the absolute encoder 2, the plate-shaped part 47 is accommodated in the bearing accommodating part 411 of the first sub-shaft gear 40, the ring part 48 is accommodated below the plate-shaped part 47, and the spacer 46B is disposed at the bearing accommodating part 411 of the first sub-shaft gear 40 in the same manner as the spacer 46 described above.

In the spacer 46B, the plate-shaped part 47 is formed of a magnetic material, but the ring part 48 may be formed of a magnetic material or may not be formed of a magnetic material. According to the spacer 46B, the shape of the plate-shaped part 47 can be determined regardless of the shape of the first bearing 44, and the flexibility of the shape of the plate-shaped part 47 can be increased.

An embodiment of the present invention has been described above, but the present invention is not limited to the absolute encoder 2 according to the embodiment of the present invention described above, and includes various aspects included in the gist of the present invention and the scope of the claims. Further, configurations may be combined with each other or combined with known technology as appropriate to at least partially address the problem described above and achieve the effects described above. For example, a shape, a material, an arrangement, a size, and the like of each of the components in the embodiment described above may be changed as appropriate according to a specific usage aspect of the present invention.

For example, in the absolute encoder 2, the configurations of the first sub-shaft gear 40, the support shaft 42, the bearing part 43, and the spacer 46 described above may be applied to the second sub-shaft gear 50.

REFERENCE SIGNS LIST

1 Motor, 1a Main shaft, 2 Absolute encoder, 3 Gear base part, 3b Base part, 4 Case, 4a Outer wall part, 5 Angle sensor support substrate, 5a Lower surface, 6 Connector, 7 Shield plate, 8a Substrate mounting screw, 10 Main shaft gear, 11 First worm gear part, 16 Holder part, 17 Magnet support part, 20 First intermediate gear, 21 First worm wheel part, 22 Second worm gear part, 23 Shaft, 28 Third worm gear part, 30 Second intermediate gear, 31 Third worm wheel part, 32 First spur gear part, 40 First sub-shaft gear, 41 Second worm wheel part, 42 Support shaft, 43 Bearing part, 44 First bearing, 45 Second bearing, 46 Spacer, 47 Plate-shaped part, 47a Upper surface, 47b Lower surface, 47c Outer peripheral surface, 48 Ring part, 48a Outer peripheral surface, 48b Inner peripheral surface, 48c Lower end surface, 49 Recess part, 50 Second sub-shaft gear, 51 Second spur gear part, 110 Substrate post, 121 Microcomputer, 121b Table processing unit, 121c Rotation amount specifying unit, 121e Output unit, 121p, 121q, 121r Rotation angle acquisition unit, 411 Bearing accommodating part, 412 Magnet holding part 412a Bottom surface, 413 Step part, 414 Through hole, 421 Outer peripheral part, 441 Inner ring 442 Outer ring, 443 Rolling element, 451 Inner ring, 452 Outer ring, 453 Rolling element, 4111, 4411, 4511 Inner peripheral part, 4421, 4521 Disk part, 4422, 4522 Cylindrical part, Mp, Mq, Mr Magnet, Sp, Sq, Sr Angle sensor

The invention claimed is:

1. An absolute encoder comprising:
a sub-shaft gear configured to rotate based on rotation of a main shaft;
a bearing part configured to rotatably support the sub-shaft gear around an axial line;
a shaft part configured to support the bearing part; and
a spacer provided between the sub-shaft gear and the bearing part, wherein
at least a part of the spacer is formed of a magnetic material, and
the spacer is formed extending in a direction intersecting the axial line.

2. The absolute encoder according to claim 1, wherein the spacer includes a plate-shaped part and a ring part, the plate-shaped part is a portion extending along a plane and has a pair of surfaces, and the ring part is an annular portion and protrudes from one of the pair of surfaces of the plate-shaped part.

3. The absolute encoder according to claim 2, wherein the ring part and the plate-shaped part are integrated with each other, and
the spacer is formed of the magnetic material.

4. The absolute encoder according to claim 2, wherein the ring part and the plate-shaped part are separate from each other, and
the plate-shaped part is formed of the magnetic material.

5. The absolute encoder according to claim 2, wherein the plate-shaped part is formed covering the bearing part in the axial direction.

6. The absolute encoder according to claim 1, wherein the bearing part includes at least one bearing,
the bearing has an outer ring and an inner ring,
the outer ring of the bearing is fixed to the sub-shaft gear,
the inner ring of the bearing is fixed to the shaft part, and
the spacer is sandwiched between the sub-shaft gear and the outer ring of the bearing in the axial direction.

7. The absolute encoder according to claim 1, wherein the sub-shaft gear includes an accommodating part forming a space capable of accommodating the spacer and the bearing part, and
the bearing part is configured to be fitted into the accommodating part.

* * * * *